Feb. 8, 1938.    T. A. BEHRENS    2,107,360
ALTERNATING CURRENT CONTROL APPARATUS
Filed July 16, 1935
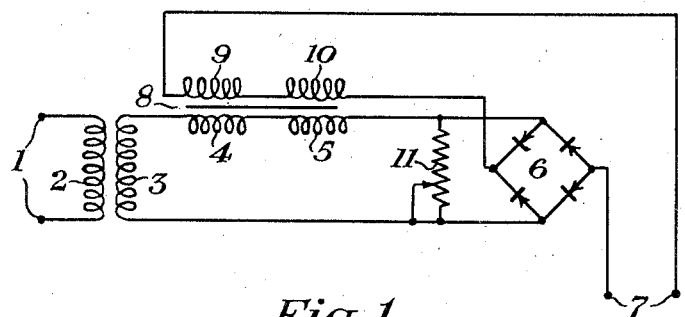
Fig.1.
Fig.2.
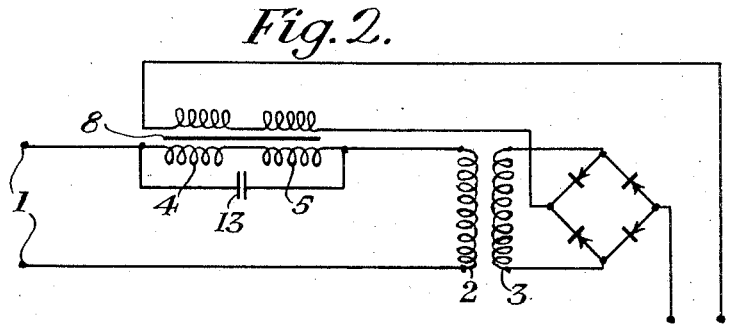
Fig.3.
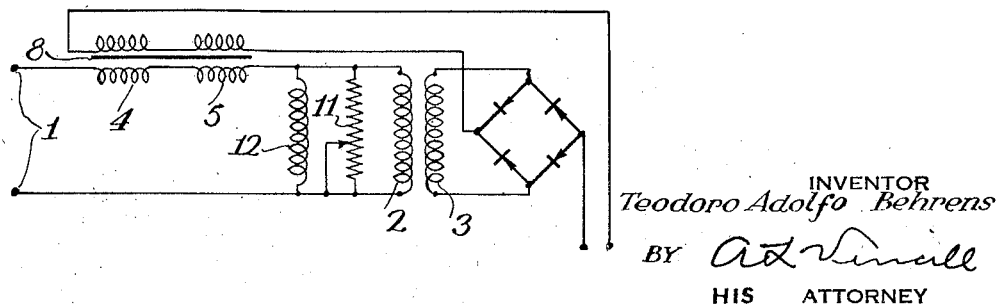
INVENTOR
Teodoro Adolfo Behrens
BY
HIS ATTORNEY Patented Feb. 8, 1938

2,107,360

UNITED STATES PATENT OFFICE 2,107,360

ALTERNATING CURRENT CONTROL APPARATUS

Teodoro Adolfo Behrens, King's Cross, London, England, assignor, by mesne assignments, to The Union Switch & Signal Company, Swissvale, Pa., a corporation of Pennsylvania Application July 16, 1935, Serial No. 31,743
In Great Britain July 17, 1934

4 Claims. (Cl. 175—363)

This invention relates to apparatus for automatically controlling the current in alternating current circuits of the kind comprising an inductance or choke coil connected in the circuit and provided with a magnetic circuit, the degree of saturation of which is arranged to be varied by means of a saturating winding adapted to be supplied with direct or rectified current.

The chief object of the present invention is to provide arrangements for adjusting the operation of control apparatus of the kind above referred to and, according thereto, in apparatus of this kind means are provided for adjusting the ratio of the alternating current ampere turns to the direct current ampere turns in the impedance or choke coil.

There are several ways in which the present invention may be carried out, for example, a resistance, preferably variable, may be connected in series with the impedance or choke coil across the source of supply of alternating current to the circuit to be controlled.

Alternatively, a condenser may be connected in parallel with the alternating current side of the impedance or choke coil.

Or, either instead of or in addition to the resistance above described, an inductance may be used.

The present invention is particularly, though not exclusively, applicable to apparatus in which a direct current load is arranged to be supplied with uni-directional current from an alternating current supply circuit through a rectifier and, in order that this invention may be the more clearly understood and readily carried into effect, we will proceed to describe the same in its application to such apparatus with reference to the accompanying illustrative drawing, in which:—

Figure 1 shows one form of apparatus according to the present invention, and

Figures 2 and 3 show other forms thereof illustrating also certain of the variations that may be made.

Referring now more particularly to Figure 1 of the drawing, the source of supply of alternating current 1 is connected to the primary winding 2 of a suitable transformer 2, 3 the secondary winding 3 of which is connected in series with the A. C. windings 4, 5 of an impedance or choke device to the input terminals of a full wave rectifier 6 of the well-known type, the output terminals of the rectifier 6 being connected to the load circuit 7.

The impedance device comprises a single magnetic core 8 provided with the two alternating current windings 4, 5, connected in series with one another and two direct current windings 9, 10 also connected in series with one another. The direct current windings 9, 10 are connected in series with the load circuit 7 and are so inductively related to the alternating current windings 4, 5 that the alternating current voltages induced in the two direct current windings 9, 10 of the device are in opposition and thus neutralized as regards their effect upon the load circuit.

An ohmic resistance 11, conveniently adjustable, is connected directly across the input terminals of the rectifier 6 and is thus connected in series with the alternating current windings 4, 5 of the impedance device across the secondary winding 3 of the transformer.

It will be evident that the resistance 11 above referred to has the effect of increasing the ratio of the ampere turns of the alternating current windings 4, 5 of the impedance device to the ampere turns of the direct current windings so that for low loads on the load circuit 7 this ratio is relatively high, whereas at higher loads the alternating current traversing the shunt path through the resistance 11 is a relatively small fraction of the total current supplied from the secondary winding of the transformer. The direct current voltage impressed upon the load circuit is thus reduced at low loads by the action of the resistance, thereby effecting an improvement in the regulation.

In the modified arrangement shown in Figure 3, the alternating current windings 4, 5 of the impedance device are connected in series with the primary winding 2 of the transformer 2, 3, the resistance 11 being connected directly across the terminals of this transformer winding. The magnetizing current in the primary winding of the transformer will evidently reduce the voltage at the terminals of the secondary winding of the transformer for open circuit and low load conditions, and, as this magnetizing current is out of phase with the load current in the transformer windings, its effect is increased as the load is reduced. The action of the resistance similarly decreases the voltage impressed upon the load circuit under low load conditions.

By varying the value of the resistance 11 the regulation can be adjusted so as to obtain the desired characteristics.

If desired, a condenser 13 (Figure 2) may be connected across the A. C. windings, 4, 5 of the impedance device. This condenser has the effect of increasing the correction obtainable with a given impedance device and will also reduce the low load voltages to a marked extent, as will be readily understood.

If preferred, an inductance 12 (Figure 3) may be connected in series with the alternating current windings of the impedance device, this inductance being employed either in addition to, or instead of, the resistance 11. The use of the inductance 12 gives the advantage that it may pass current which is relatively great compared with low load currents, but as the current through the inductance is out of phase it only forms a negligible proportion of the full load current. Such an arrangement may be used when high efficiency is important. If preferred, the choke coil 12 and resistor 11 of Fig. 3 may be eliminated by suitably choosing the impedance of the transformer windings 2 and 3. The resulting arrangement will be identical with Fig. 2 except for the condenser 13 which may or may not be used, in accordance with the amount of correction which is desired.

Having now described my invention, what I claim as new and desire to secure by Letters Patent is:—

1. In combination, a source of alternating current, a rectifier for supplying current to a load, a transformer having its input winding energized from said source and having its output winding connected across the input terminals of said rectifier, a choke coil and a resistor connected in parallel with each other across the input winding of said transformer for causing an initial current to be furnished from said source at such time as the load on the output circuit of said rectifier is zero, a saturable reactor having its impedance winding included in the input circuit of said transformer between said source and said choke coil and resistor connection, and a control winding of said reactor connected in the output circuit of said rectifier for controlling the saturation of said reactor in accordance with the current supplied to said load.

2. In combination, a source of alternating current, a rectifier for supplying current to a load, a transformer having its input winding energized from said source and having its output winding connected across the input terminals of said rectifier, a choke coil connected across the input winding of said transformer for causing an initial current to be furnished from said source at such time as the load on the output circuit of said rectifier is zero, a saturable reactor having its impedance winding included in the input circuit of said transformer between said source and said choke coil connection, and a control winding of said reactor connected in the output circuit of said rectifier for controlling the saturation of said reactor in accordance with the current supplied to said load.

3. In combination, a source of alternating current, a rectifier for supplying current to a load and having an input circuit receiving energy from said source, a choke coil and a resistor connected in parallel with each other across the input circuit of said rectifier for causing an initial current to be furnished from said source at such time as the load on the output circuit of said rectifier is zero, a saturable reactor having its impedance winding included in the intput circuit of said rectifier between said source and said choke coil and resistor connection, and a control winding for said reactor connected in the output circuit of said rectifier for controlling the saturation of said reactor in accordance with the current supplied to said load.

4. In combination, a source of alternating current, a rectifier having an input circuit receiving energy from said source, an impedance connected in parallel with the input circuit of said rectifier, a saturable reactor having a single magnetizable core and having a pair of impedance windings connected in series aiding and included in the input circuit of said rectifier between said source and said impedance connection, a pair of control windings for said reactor connected in series opposition in the output circuit of said rectifier, and a condenser connected across the impedance windings of said reactor.

TEODORO ADOLFO BEHRENS.